United States Patent [19]

Garigioli

[11] 4,235,609
[45] Nov. 25, 1980

[54] OIL BATH AIR CLEANER

[75] Inventor: Alberto Garigioli, Pisa, Italy

[73] Assignee: Whitehead Motofides S.p.A., Livorno, Italy

[21] Appl. No.: 959,205

[22] Filed: Nov. 9, 1978

[30] Foreign Application Priority Data

Nov. 10, 1977 [IT] Italy ............................ 69520 A/77

[51] Int. Cl.³ ................... B01D 47/02; B01D 47/10
[52] U.S. Cl. ............................... 55/226; 55/239;
   55/245; 55/251; 55/255; 55/259; 55/485;
   55/498; 55/502
[58] Field of Search .............................. 55/224–226,
   55/237–239, 245, 248, 249–253, 255, 256, 259,
   257 C, 482, 485, 498, 502; 261/123, DIG. 54

[56] References Cited

U.S. PATENT DOCUMENTS

| 1,838,511 | 12/1931 | Wilson | 55/253 |
| 2,387,278 | 10/1945 | Lowther | 55/251 |
| 2,397,525 | 4/1946 | Bennett | 55/253 |
| 2,770,320 | 11/1956 | Dreznes | 55/253 |
| 2,947,381 | 8/1960 | Cook et al. | 55/252 |
| 3,076,555 | 2/1963 | Jackson et al. | 55/502 |
| 3,293,830 | 12/1966 | McKinlay | 55/502 |
| 3,298,149 | 1/1967 | Sobeck | 55/252 |
| 3,348,364 | 10/1967 | Henby | 55/233 |
| 3,417,551 | 12/1968 | Bonell | 55/502 |
| 4,116,647 | 9/1978 | Garner | 55/253 |

FOREIGN PATENT DOCUMENTS

| 706167 | 4/1941 | Fed. Rep. of Germany | 55/248 |
| 1113852 | 9/1961 | Fed. Rep. of Germany | 55/250 |
| 1170672 | 1/1959 | France | 55/251 |
| 935040 | 8/1963 | United Kingdom | 55/250 |
| 257925 | 1/1971 | U.S.S.R. | 55/485 |
| 573607 | 10/1977 | U.S.S.R. | 55/250 |

Primary Examiner—David L. Lacey
Attorney, Agent, or Firm—Gifford, VanOphem, Sheridan & Sprinkle

[57] ABSTRACT

An air cleaner for an internal combustion engine is disclosed in which the air cleaner comprises a casing having an inlet and an outlet and in which air flow from the inlet to the outlet passes into contact with a pool of liquid. The main feature of said air cleaner is that there is at least one filter cartridge of the mesh or wool type, and also at least one paper filter cartridge of relatively small height positioned within the casing between the pool of liquid and the casing outlet.

18 Claims, 3 Drawing Figures

OIL BATH AIR CLEANER

BACKGROUND OF THE INVENTION

This invention relates to an air cleaner for internal combustion engines, of the type in which the air in the cleaner passes into contact with a liquid, which is conveniently oil. These cleaners are generally mounted on power machines in which the air is very dusty and dirty, such as earth working machines, tractors, trucks and the like.

Said cleaners of known type are generally in the form of a cylindrical outer casing in which the oil is contained at the bottom, with metal mesh filter cartridges disposed in the central and upper region. The air which is fed to the cleaner through an axial cylindrical conduit inside the container flows out into the lower inner region of the container which contains the oil. Part of the solid particles in the air is retained by the oil particles which rise by suction action, while the remainder is retained by the filter cartridges. The filtered air emerges from the container above the cartridges, drawn by the engine.

SUMMARY OF THE INVENTION

The object of the present invention is to provide an oil bath air cleaner which has a greater filtering power than those comprising filter cartridges of metal mesh or wool, so that it can be advantageously used under particularly severe operating conditions, without notably increasing the external overall volume of the filter casing.

The present invention therefore provides an air cleaner for internal combustion engines, of the type having a casing in which the air passes into contact with a liquid, comprising at least one filter cartridge of the mesh or wool type, and at least one paper filter cartridge of relatively small height.

BRIEF DESCRIPTION OF THE DRAWINGS

The present invention will be more apparent from the description given hereinafter by way of non-limiting example of one embodiment, with reference to the accompanying drawings in which.

DETAILED DESCRIPTION OF THE INVENTION

Figure 1:
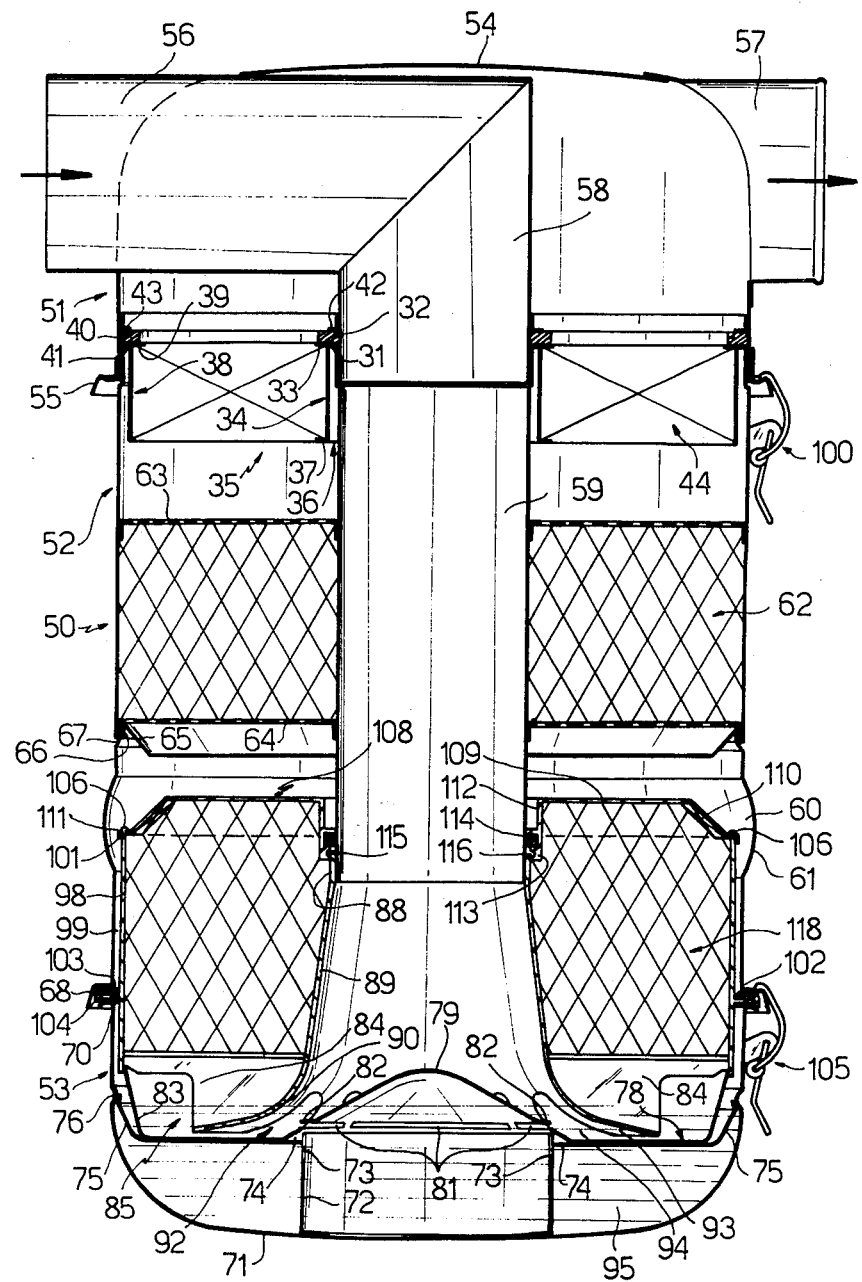
FIG. 1 is a side sectional view of an air cleaner according to the present invention.
Figure 2:
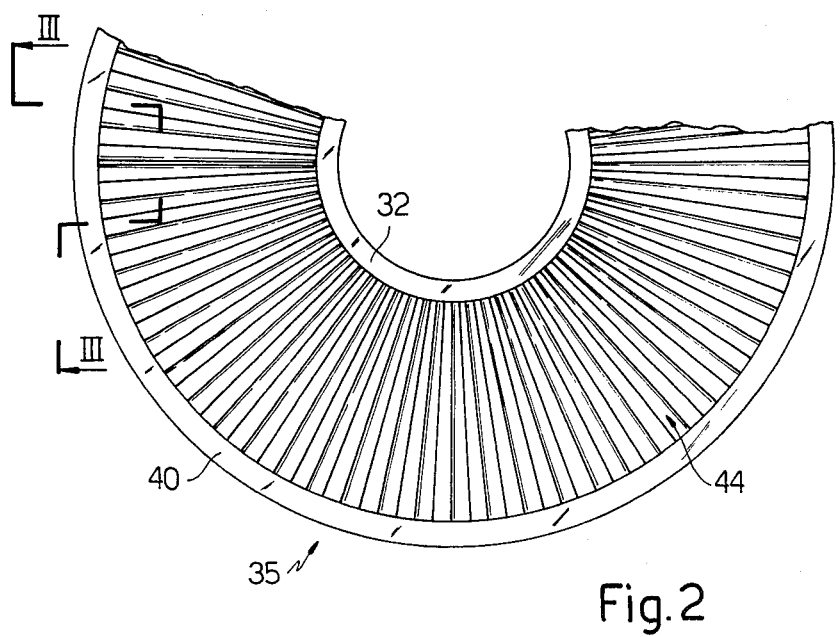
FIG. 2 is a partial plan view of a paper filter cartridge contained in the cleaner of FIG. 1.

With reference to FIG. 1, the air cleaner according to the present invention comprises a substantially cylindrical outer casing indicated by 50, advantageously of sheet metal, and constituted by an upper part 51, a central part 52 and a lower part 53, which are separable. The upper part 51 comprises an upper head 54, and an open bottom end having a substantially L-shaped outer annular rim 55 to provide an enlarged diameter lip around the open bottom. Conduit portions 56 and 57 are fixed towards the top of the part 52 for the inlet and outlet of the air respectively. The end of the conduit portion 56 inside the casing 50 is cut at 45°, and is welded to the upper end, also cut at 45°, of a vertical conduit portion 58, also of sheet metal and disposed axially in the casing 50. The conduit portion 58 terminates at its bottom at the level of the rim 55 of the part 51, and about its terminal portion there is mounted an upper portion, of greater diameter, of a conduit 59 which is also disposed axially in the casing 50 and terminates at its lower end at a slightly lower level than that of an annular chamber 60 created by an enlarged diameter region 61 in the wall of the central part 52. The conduit 59 comprises an upper rim 31 bent orthogonally outwards, and supports an annular gasket 32 which is fixed on an upper annular rim 33 of an annular sheet metal member 34 which internally defines a filter cartridge indicated overall by 35.

The cartridge 35 is cylindrical externally so that it can be contained in the casing 50, and is of relatively low height so as not to substantially increase the external overall dimensions of the casing 50. The height of the cartridge 35 is conveniently less than the cartridge radius. The annular member 34, which internally defines an empty cylindrical region 36 for passage of the conduit 59, also comprises a lower annular rim 37 bent orthogonally outwards from the cartridge 35, as in the case of the rim 33. Externally, the cartridge 35 is defined by an annular sheet metal member 38 provided upperly with an annular rim 39 bent orthogonally towards the inside of the cartridge 35. On the annular rim 39 there is fixed, for example by adhesive, an annular rubber gasket 40 which externally rests on an upper annular rim 41 of the central part 52, this rim being bent orthogonally inwards. The annular gaskets 32 and 40 are squeezed upperly by two respective annular washers 42 and 43, fixed respectively to the conduit portion 58 and to the inside of the upper part 51.

Figure 3:
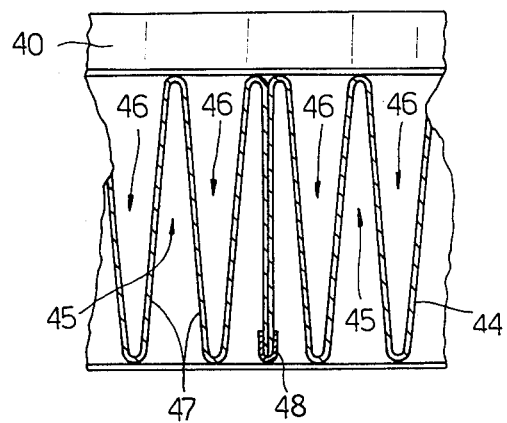
FIG. 3 is a sectional side view on the line III—III, of a portion of the filter cartridge of FIG. 2.

The filter cartridge 35 comprises air filtering paper 44 of known type glued between the annular member 34 and annular member 38, and folded along upper and lower creasing lines 45 and 46 respectively, as shown in FIG. 3, to define a plurality of relatively adjacent portions 47 of height substantially equal to the height of the annular members 34 and 38. The creasing lines 45 and 46 are perpendicular to the axis of the filter cartridge 35, and thus to the axis of the casing 50, and in particular are radial. The terminal edges of the two portions 47 at the ends of the paper 44 are placed adjacent each other and fixed hermetically together by means of a channel 48, for example of metal, which is squeezed or glued on to said adjacent edges of the terminal portions 47.

A filter cartridge 62 of known type, constructed advantageously of tubular galvanized steel mesh, is disposed below the filter cartridge 35 about the conduit 59 in the central part 52 of the casing 50, and is enclosed between an upper annular disc 63 and a lower annular disc 64, which are welded to the central part 52 of the casing 51 and to the conduit portion 59. An annular baffle 65 inclined inwardly towards the bottom of the casing 50 is fitted below the lower disc 64, and is provided with an annular wall 66 which is snap-fitted over inner teeth 67 provided on the wall of the part 52. The central part 52 is also open at its lower end and comprises a substantially L-shaped outer annular rim 68.

The lower part 53 is open upperly and comprises an outer annular rim 70, whereas its lower region is of progressively decreasing diameter and has a lower base 71, to the inside of which is welded a cylindrical socket 72 having a height slightly less than the height of the decreasing diameter region of the lower part 53. Towards the top of the socket 72, where a plurality of bores 73 are provided, there are fixed a plurality of radial fins 74, for example eight, which towards their outer end comprise portions 75 bent upwards to rest on an inner annular projection 76 on the lateral wall of the lower part 53. A disc 78 is fixed on said radial fins 74, for example by welding, and comprises at its central portion, above the socket 72, an approximately conical upwardly pointing part 79 comrprising, in proximity to its base above the edge of the socket 72, a number of longitudinal long slots 81, for example four, originating from a sheet metal portion 82 of the part 79 which is cut and bent upwards. The disc 78 comprises an upwardly bent annular portion 83 at its outer edge, and which by its contact with spokes 84 of a member 85 cooperates in positioning said member 85.

The member 85 is advantageously of plastics construction, and comprises centrally an upper cylindrical portion 88 which is mounted over the outer lower region of the conduit 59. An inner cone frustum conduit 89 with its diameter progressively increasing downwards derives axially from the bottom of the portion 88, and has a flared terminal portion 90. The inclination of the generating lines of the conduit 89 to the axis is advantageously 7°±2°. The length of the conduit 89 with the portion 90 is such that the lower edge of the portion 90 is in proximity to the disc 78, and the shape of the terminal portion 90 is such as to define, towards the part 79, a region of minimum section at the slots 81. In said terminal portion 90 there is provided toothing 92 comprising a plurality of substantially triangular teeth 93 and spaces 94 distributed uniformly. The height of the toothing 92 substantially reaches the beginning of the portion 90, so that the lower vertices of the teeth 93 are immersed in oil, indicated by 95, which fills the bottom 53 as far as the inner annular projection 76, and the upper vertices of the spaces 94 are substantially at the upper level of the oil 95. An outer annular cylindrical wall 98 is rigidly connected by the spokes 84 to the portion 90, and has an outer diameter less than the inner diameter of the casing 50, so as to define an annular chamber 99. The cylindrical wall 98 reaches the annular compartment 60, and upperly comprises an outer perimetral rim 101. It also comprises, substantially a little below its middle, an outer annular appendix 102, in which a plurality of through bores 103 are provided. A perimetral gasket 104 of C cross-section is disposed about the edge of the appendix 102 externally to the bores 103, and is compressed between the outer annular rim 68 of the part 52 and the outer annular rim 70 of the part 53, by closing the hooks 105. Further hooks 100 are disposed between the upper part 51 and central part 52, to fix them together.

The member 85 also comprises a plurality of appendices 106 deriving vertically from the upper edge of the wall 98, which, as shown in FIG. 1, are inserted into corresponding slots in an outer edge 111 of a member 108, and are hot-turned over the edge 111 to fix the member 108 on to the member 85. The member 108, also of plastic construction, has an upper flat surface 109 comprising, towards the outer edge 111, a plurality of fins 110 which are suitably spaced apart and inclined in order to form finning, for example of helical type. On the inside of the flat surface 109 there is a cylindrical wall portion 112 which lowerly comprises a central ring 113, the inner diameter of which is substantially equal to the outer diameter of the conduit 59, on the bottom of which it is disposed. An annular gasket 114 for sealing about the conduit 59 is housed in the inside of the ring 113, and an annular seat 115 is provided for snap fitting a corresponding outer annular projection 116 on the cylindrical portion 88. A filter cartridge 118, of the same type as the air cleaner cartridge 62, is enclosed between the members 85 and 108.

The filter according to the present invention is assembled as follows. The upper part 51, central part 52 and lower part 53 of the casing 50 are firstly constructed separately, with the conduit portion 57, the conduit portions 56 and 58, the annular washers 42 and 43 connected to the upper part 51, the conduit 59 with the discs 63 and 64 which enclose the filter cartridge 62, the annular baffle 65 connected to the central part 52, and the socket 72 with the fins 74 and disc 78 connected to the lower part 53. The member 108 is fixed on to the member 85 by snap-fitting the annular projection 116 into the seat 115 and turning the appendices 106 over the edge 111, after interposing the filter cartridge 118. After filling the lower part 53 with oil 95, the outer perimetral rim 103 of the member 85, about which the perimetral gasket 104 is disposed, is rested on the annular rim 70 of the lower part 53, and the outer lower edge of the spokes 84 rests on the upper edge of the portion 83 of the disc 78. The outer annular rim 68 of the central part 52 is then rested on the gasket 104, and correspondingly the bottom of the conduit 59 is inserted into the central ring 113 and into the upper cylindrical portion 88 of the member 85. The parts 52 and 53 are then hermetically fixed together by the hooks 105.

The upper part 51 is then placed on the central part 52, after disposing the filter cartridge 35 in the part 52 such that the annular gaskets 32 and 40 rest respectively on the upper rim 31 of the conduit portion 59 and on the upper rim 41 of the central part 52. The conduit portion 58 is inserted into the top of the conduit 59, and the annular washers 42 and 43 rest on the annular gaskets 32 and 40, which are thus squeezed when the hooks 100 which hermetically fix together the parts 51 and 52 are engaged.

The operation of the air cleaner according to the present invention is as follows.

The air to be cleaned is drawn through the conduit portions 56, 58 and 59, and passes through the conduit 89 and the portion 90 of the member 85. In the region of smaller section, relative to the disc 78, it draws oil 95 through the slots 81 and then flows out through the spaces 94 of the toothing 92. A large part of the impurity particles present in the air is retained by the oil particles, which are lifted by the suction and which to a certain extent are halted by the filter cartridge 118. The other impurity particles in the air, whether mixed with the oil or not, together with the air itself, flow from the top of the member 85, pass through the spaces between the fins 110 in the form of helical finning, and are subjected to centrifugal action, because of which the impurity particles and the oil are forced towards the wall of the part 52 due to the fact that their density is different from air. The air, already considerably purified, then passes through the filter cartridge 62, which almost completely purifies it, and then flows through the filter cartridge 35 which purifies it completely, to flow from the casing 50 through the conduit portion 57. The oil and impurity particles present in the compartment 60, which is relatively undisturbed because of the screening action exerted by the annular baffle 65, fall downwards into the annular compartment 99, and the oil returns through the bores 103 into the bottom of the part 53 and hence into the socket 72, whereby the described cycle recommences.

The described air cleaner, constructed in accordance with the present invention, has considerable advantages. Firstly, it has a considerably higher air cleaning power than air cleaner of known type, even though the outer dimensions of the casing 50 differ little from these. This is because in addition to the known filter cartridges 62 and 118 of metal mesh, it also comprises the paper filter cartridge 35 of relatively small height, but of relatively high filtering power. As the filter cartridge 35 is in the form of a plurality of adjacent portions 47 folded in radial directions, and of relatively small height, it has a very high filter area for a minimum external bulk, and has good operational reliability.

The described air cleaner also has further characteristics which increase its air cleaning power, so enabling it to be used advantageously in particularly severe conditions. In this respect, a suction action is generated on the oil in the minimum section region at the slots 81, leading to a more intimate mixing with the air, and in addition the fins 110 on the member 108 provide a centrifugal action on the air and on the oil and impurity particles, so aiding their separation.

The described air cleaner also has good cleaning power at low throughputs. This is because at low throughputs the oil level in the bottom 53 is relatively high, so that the uncovered section of the spaces 94 in the toothing 92 is relatively small. There is thus a flow velocity of the air through the spaces 94 which is sufficient to allow it to associate itself with the necessary oil quantity for cleaning the air. This flow velocity under working conditions is established naturally by an equilibrium condition between the progressive uncovering of the spaces 94 and the progressive reduction in the air velocity. At medium and high throughputs, greater sections of the spaces 94 are uncovered, but the flow velocity of the air is substantially almost constant, such as to determine a constant and optimum ratio between the air quantity passing through the cleaner and the oil quantity associated with the air during its passage, to substantially ensure uniform air cleaning conditions.

Finally, as the air flows towards the oil in the bottom of the casing 50 through the inclined wall conduit 89, a relatively small pressure drop is achieved, and sufficiently high throughputs are obtained. The annular baffle 65 reduces the quantity of oil reaching the filter cartridge 62, and prevents the oil from passing beyond the cartridge 62 to wet the paper filter cartridge 35.

The fact that the casing 50 is constructed in three parts which can be rapidly separated and coupled by the hooks 105 and 100 enables the filter cartridge 35 and/or filter cartridges 62 and 118 to be rapidly replaced.

Finally, it is apparent that modifications can be made to the described embodiment of the air cleaner according to the present invention, which do not leave the scope of the inventive idea contained therein.

I claim:

1. An air cleaner for internal combustion engines said air cleaner being of the type having a casing having an air inlet and an air outlet, said casing having an outer wall which defines an inner housing chamber, a pool of liquid in the bottom of the casing, fluid passageway means connected at one end to said inlet and open at its other end to said pool; and a first filter cartridge constructed of wool or metal mesh positioned between said pool of liquid and said outlet so that air flow from said inlet and through said fluid passageway means passes into contact with said pool of liquid and then through said first filter cartridge, said cleaner further comprising:

a second filter cartridge of relatively small height disposed between said first filter cartridge and said outlet, said second filter cartridge being constructed of paper;

said fluid passageway means further comprising first means to provide a substantially constant ratio between the quantity of air passing through said fluid passageway means and the quantity of liquid associated with the air during its passage, said first means comprising a tubular member having a plurality of spaces, said spaces being at least partially immersed in said liquid;

means for exerting a centrifugal action on the air leaving said first filter cartridge;

means for creating a relatively calm region adjacent the outer wall of the casing, said last mentioned means being disposed in said housing chamber between said centrifugal means and said outlet and comprising an annular baffle fixed to the outer wall of the casing and further comprising an enlarged portion of the outer wall of the casing of said cleaner, said enlarged portion of the wall extending from said centrifugal means and toward said outlet;

passage means for fluidly connecting said calm region with said pool of liquid; and wherein increases and decreases in air pressure within said tubular member effects a lowering and raising, respectively, of the level of liquid in which said spaces are immersed.

2. An air cleaner as claimed in claim 1 wherein said casing is tubular and cylindrical in cross section, and wherein the air cleaner further comprises a cylindrical wall coaxially secured around said tubular member and having a diameter slightly less than the diameter of the outer wall of said casing so as to define an annular chamber between said cylindrical wall and said outer wall of the casing and wherein said passage means comprises said annular chamber.

3. An air cleaner as claimed in claim 2, wherein said casing comprises two separable housing parts, and wherein said cylindrical wall includes an outer annular rim having a first portion which is hermetically enclosed between said two separable housing parts and a second portion which includes axial throughbores, and wherein said passage means comprises said axial throughbores through said second portion.

4. An air cleaner as claimed in claim 1 and further comprising a further filter cartridge of the mesh or wool type disposed between said means for creating a calm region and said paper filter cartridge.

5. An air cleaner as claimed in claim 1, wherein said tubular member includes a plurality of teeth at its bottom end, said teeth being at least partly immersed in said liquid.

6. An air cleaner as claimed in claim 5, wherein said teeth are substantially triangular in shape.

7. An air cleaner as claimed in claim 1, wherein said first means further comprises a frusto-conical member coaxially secured at the lower end of said tubular member having its wide circumference at its bottom end, said bottom end of said frusto-conical member having a plurality of circumferentially spaced teeth, and wherein the inclination of the generating lines of said frusto-conical member to its axis is between 5 degrees and 9 degrees.

8. An air cleaner as claimed in claim 7, wherein said frusto-conical member includes a flared bottom end portion.

9. An air cleaner as claimed in claim 7, wherein said frusto-conical member is the radially inner wall of a substantially annular member.

10. An air cleaner as claimed in claim 9, wherein said first filter cartridge is retained in said substantially annular member.

11. An air cleaner as claimed in claim 1, wherein said centrifugal means comprises an annular member secured around said tubular member and having a plurality of circumferentially spaced inclined fins forming spaces to provide a helically directed flow of air past said annular member.

12. An air cleaner as claimed in claim 11, wherein said first filter cartridge is enclosed in said annular member.

13. An air cleaner as claimed in claim 11, wherein said tubular member and said annular member are made of plastic.

14. An air cleaner as claimed in claim 1, wherein the outermost surface of said second paper filter cartridge is cylindrical in shape and has an axial length less than its radius.

15. An air cleaner as claimed in claim 14, wherein said second filter cartridge includes at least one strip of paper folded successively along its length in substantially opposite directions about a plurality of spaced apart creasing lines which are substantially perpendicular to a longitudinal axis of said cartridge, to thereby form a plurality of relatively adjacent portions.

16. An air cleaner as claimed in claim 15, wherein said creasing lines of said filter paper extend radially with respect to the cylindrical shape of the second filter cartridge.

17. An air cleaner as claimed in claim 16, wherein said second filter cartridge is in the form of an annular ring, and comprises an outer annular member, an inner annular member, and two annular gaskets, wherein said outer and inner annular members are fixed hermetically to the outer and inner radial edges respectively of said filter paper, and wherein respective ones of said annular gaskets are secured to said outer and inner annular members; and wherein said casing includes radially inwardly extending projections and said tubular means includes radially outwardly extending projections so that one of said gaskets is squeezed between said casing and said outer annular member and so that the other gasket is squeezed between said tubular member and said inner annular member, said gaskets abutting against said projections to position and support said paper filter cartridge.

18. An air cleaner as claimed in claim 1, wherein the liquid is oil.

* * * * *

UNITED STATES PATENT AND TRADEMARK OFFICE
CERTIFICATE OF CORRECTION

PATENT NO. : 4,235,609
DATED : November 25, 1980
INVENTOR(S) : Alberto Garigioli It is certified that error appears in the above-identified patent and that said Letters Patent are hereby corrected as shown below:

Column 4, line 5, delete "filter" and insert --air cleaner-- therefor;

Column 5, line 4, delete "cleaner" and insert --cleaners-- therefor.

Signed and Sealed this

Seventeenth Day of March 1981

[SEAL]

Attest:

RENE D. TEGTMEYER

Attesting Officer     Acting Commissioner of Patents and Trademarks